(12) United States Patent
Kasehagen et al.

(10) Patent No.: US 6,599,990 B2
(45) Date of Patent: Jul. 29, 2003

(54) SAFE, EFFICIENT, LOW T-BUTANOL FORMING ORGANIC PEROXIDE FOR POLYPROPYLENE MODIFICATION

(75) Inventors: Leo Kasehagen, Malvern, PA (US); Robert Kazmierczak, Exton, PA (US); Robert Cordova, Bethlehem, PA (US); Terry Myers, Phoenixville, PA (US)

(73) Assignee: ATOFINA Chemicals, Inc., Philadelphia, PA (US)

( * ) Notice: Subject to any disclaimer, the term of this patent is extended or adjusted under 35 U.S.C. 154(b) by 0 days.

(21) Appl. No.: 10/293,168

(22) Filed: Nov. 12, 2002

(65) Prior Publication Data

US 2003/0119997 A1 Jun. 26, 2003

Related U.S. Application Data

(62) Division of application No. 10/013,269, filed on Dec. 12, 2001, now Pat. No. 6,503,990.
(60) Provisional application No. 60/261,110, filed on Jan. 12, 2001.

(51) Int. Cl.[7] .................................................. C08F 8/00
(52) U.S. Cl. ..................... 525/333.8; 525/384; 525/387
(58) Field of Search ........................................ 525/333.8

(56) References Cited

U.S. PATENT DOCUMENTS

| 3,144,436 A | 8/1964 | Greene et al ............... 260/93.7 |
| 3,236,872 A | 2/1966 | Manly et al ................. 260/453 |
| 4,707,524 A | 11/1987 | Ehrig et al. .................. 525/387 |
| 5,475,072 A | 12/1995 | Sanchez et al. ............. 526/266 |
| 5,489,699 A | 2/1996 | Sanchez et al. ............. 549/352 |
| 5,494,988 A | 2/1996 | Sanchez et al. ............. 526/266 |
| 5,932,660 A | 8/1999 | Meijer et al. ................ 525/256 |

FOREIGN PATENT DOCUMENTS

| EP | 0423639 | 4/1991 |
| EP | 853090 A1 | 7/1998 |
| WO | WO9936466 | 7/1999 |

OTHER PUBLICATIONS

Lagardere et al, ANTEC, pp 2243–2247, 1998.
Callais, Proc. Water–Borne Higher Solids Coat. Symp., 1990, Abstract only.

*Primary Examiner*—Bernard Lipman
(74) *Attorney, Agent, or Firm*—William D. Mitchell

(57) ABSTRACT

Molecular weight modification of polypropylene by 4-(t-amylperoxy)-4-methyl-2-pentanol and polypropylene so modified suitable for handling and packaging food, beverages and pharmaceuticals and for use in medical devices is disclosed.

1 Claim, No Drawings

SAFE, EFFICIENT, LOW T-BUTANOL FORMING ORGANIC PEROXIDE FOR POLYPROPYLENE MODIFICATION

This application is a division of application Ser. No. 10/013,269, filed Dec. 12, 2001, now U.S. Pat. No. 6,503,990 which claims priority from provisional application 60/261,110 filed Jan. 12, 2001.

BACKGROUND OF THE INVENTION

This invention relates to compositions of matter classified in the art of organic chemistry as organic peroxides, more particularly as the peroxide derivatives of the hydroperoxide of 2-methyl-2, 4 pentanediol (hexylene glycol hydroperoxide), specifically 4-(t-amylperoxy)-4-methyl-2-pentanol and higher branched chain alkyl analogs, their use in the molecular weight modification of polypropylene and also to articles made from such polypropylene which are suitable for use in regulated food, beverage, pharmaceutical and medical-device applications.

BACKGROUND ART

U.S. Pat. No. 3,144,436 teaches the use of organic peroxides for the molecular weight modification of polypropylene by reactive extrusion. A broad class of peroxides suitable for use in the process is defined in terms of a broad range of half-life temperatures and injection of solvent solutions of a peroxide into the melt zone of the extruder is the preferred method of operation. The broad class of peroxides defined does not enable one to select a peroxide which does not generate or only generates small amounts of t-butanol in practice, which can be used without solvents and which otherwise minimizes to an acceptable level safety hazards inherent in handling organic peroxides.

Over time, because of its safety in handling and decomposition temperature, one specific peroxide, 2,5-dimethyl-2,5-di(t-butylperoxy)hexane (LUPEROX® 101), has become the industry standard for polypropylene modification.

While generally satisfactory from the viewpoint of efficiency, of being useable without solvent dilution and from the safe handling standpoint, this product is known to leave an amount of residual t-butanol in the extruded polypropylene which meets food grade standards but which for some uses is objectionable. Therefore, a substitute having similar safe handling without the need for solvents, roughly the same efficiency in actual use in the extrusion process for polypropylene molecular weight modification and which does not produce objectionable amounts of t-butanol as a decomposition product has long been sought by the industry.

An attempt to address this issue is shown in U.S. Pat. No. 4,707,524 which discloses the use of peroxides which do not decompose to t-butanol and which have a half-life in the range from about 1.0 to 10 hours at 128° C. for modification of the molecular weight of polypropylene. As shown by the actual data in the tables in that patent, however, LUPEROX 101 was far more efficient than either the 2,2 di(t-amyl) peroxy propane (LUPERSOL® 553) and 3,6,6,9,9-pentamethyl-3-n-propyl-1,2,4,5-tetraoxacyclononane (ESPERAL® 529) actually compared with it. The discussion of the background art at columns 2 and 3 of this patent may also be of interest in understanding the present invention.

EP 0853090 AI discloses the use of di-t-amyl peroxide as suitable for polypropylene molecular weight modification while avoiding the generation of t-butanol. However, di-t-amyl peroxide suffers from a very low flash-point that compromises safety and handling characteristics in polypropylene modification processes.

The majority of today's production processes require that the peroxide be mixed with solid polypropylene in a blender. Under such conditions, it is crucial that the peroxide have a high flash-point for safety. The flash-point of di-t-amyl peroxide is roughly 25° C. while the flash-point of LUPEROX 101 ranges from about 50° C. to 75° C. depending on quality. 4-(t-Amylperoxy)4-methyl-2-pentanol also has a flash-point greater than 50° C. and can be used in similar fashion to LUPEROX 101 in current mixing equipment.

4-(t-Amylperoxy)-4-methyl-2-pentanol is among the hexylene glycol-derived perester and peroxide compounds generically disclosed in U.S. Pat. No. 3,236,872.

The compounds are stated to be useful in the crosslinking of substantially saturated polymers including polypropylene but no t-amyl derivatives were actually tested and crosslinking of polypropylene would increase molecular weight and is the exact opposite of the molecular weight reduction and variation narrowing which occurs during the normal polypropylene molecular weight modification process (lower molecular weight is equivalent to faster melt flow in viscosity measurements).

4-(t-Amylperoxy)-4-methyl-2-pentanol has over the years found utility as a reactant or a reaction catalyst which made use of its hydroxy functionality for various purposes. Illustrations of these uses are contained in: U.S. Pat. Nos. 5,475,072; 5,494,988; and 5,489,699; Laerdere et al, Ann. Tech. Conf.—Soc. Plant. Eng. (1998); and Callais, Proc. Water-Borne High Solids Coat. Conf. (1990).

Nothing in any art known to applicants suggests that 4-t-amylperoxy)-4-methyl-2-pentanol will have activity, on an equal active oxygen basis, approximating the efficiency of LUPEROX 101 in the modification of polypropylene while generating commercially acceptable levels of residual t-butanol in the modified polypropylene.

One other recent reference, U.S. Pat. No. 5,932,600 (and its related U.S. and European counterparts) teaches the use of cyclic ketone peroxides particularly methyl ethyl ketone cyclic trimer peroxide for polypropylene modification. The principal advantage of these products is that they do not produce t-butanol as a decomposition by-product. However, these peroxides suffer from excessively long half-lives and the required use of safety diluent. The long half-life is undesirable because it will lead to product quality problems (residual peroxide in resin) or lower productivity/higher resin color depending on the production changes made to avoid undecomposed peroxide in the resin (longer residence times or higher temperatures in the extruder). In addition, diluents are undesirable in at least some polypropylene grades because they may produce "smoking" or "dripping" in an end user's extruder. It has been reported that diluents are also undesirable for fiber or film grades where, for example, they may adversely affect the feel of the surface.

SUMMARY OF THE INVENTION

The invention provides in a first process aspect, a process for the molecular weight modification of polypropylene which comprises treating polypropylene with a molecular weight modifying effective amount of 4-(t-amylperoxy)-4-methyl-2-pentanol for a time and a temperature sufficient to induce decomposition of the 4-(t-amylperoxy)4-methyl-2-pentanol and thereby modify the molecular weight of the polypropylene.

The first process aspect of the invention provides a process for the conversion of very high molecular weight, difficult to process polypropylene to low or moderate molecular weight, easy to process polypropylene at an efficiency approximately equal to the conversion efficiency of LUPEROX 101 at approximately equivalent active oxygen levels without the generation of commercially unacceptable levels of t-butanol, while minimizing the hazards such as those incurred in handling di-t-arnylperoxide, the need of safety solvents or modifying process conditions to accommodate higher half-life initiators.

The invention provides in a first composition aspect, a non-toxic polypropylene containing composition adapted for the handling and packaging of foods, beverages, or pharmaceuticals, or for use in a medical devices comprising a polypropylene resin which has been molecular weight modified by the first process aspect of the invention and which contains less than 100 ppm (parts per million) t-butanol.

DETAILED DESCRIPTION

In practicing the processes of the invention to prepare the melt flow modified polypropylene resulting from their practice, conventional, well known, procedures for incorporating the peroxy compound into and reacting it with the polypropylene may be employed. These techniques are described in the previously cited references and no particular technique is considered particularly critical to the practice of the invention.

Conveniently, known amounts of peroxide are premixed with polypropylene flakes, powders or pellets containing conventional additives and/or stabilizers, preferably under an inert atmosphere (absence of molecular oxygen). The polypropylene contemplated as being modified by the invention includes copolymers with up to about 25% by weight ethylene. The peroxide material should be added to the polypropylene, pellets, flake or powder in concentrations of from 50 to 10,000 ppm by weight (molecular weight modifying amount). More desirable is from 100 to 2,000 ppm of peroxide. The components (polypropylene, peroxide and additives) may be premixed at room temperature or above and then in an extruder at temperatures not exceeding 550° F. (about 288° C.), or more desirably from 200 to 260° C., or the polypropylene powder, pellets or flakes and additives can be premixed at room temperature and fed concurrently with peroxide to an extruder, or all the ingredients can be preblended in a heated mixer, not exceeding 100° C. prior to adding to an extruder.

The mixture should be processed at a temperature of from about 350° F. (177° C.) to 550° F. (288° C.) (temperature sufficient to induce decomposition of the 4-(t-amylperoxy) 4-methyl-2-pentanol) for a time necessary to reduce the melt flow rate to the desired rate (which may be readily determined by a few pilot experiments by one of skill in the art). More particularly the present invention contemplates as a particular advantage its use at time and temperature profiles currently employed for LUPEROX 101, generally temperatures less than 240° C.

When 4-(t-amylperoxy)-4-methyl-2-pentanol is used in the above general procedure, no peroxide material remains in the polypropylene, and the amount of t-butanol contained in the peroxide is substantially less than the residual concentration left by LUPEROX 101 when used on an equal active oxygen basis.

Although the invention has been illustrated by the addition of the peroxide to the modification process as a master batch absorbed on polypropylene, one of skill in the art will understand that it may be used as a neat liquid injected directly into an early stage of the extrusion process, or as a master batch absorbed on an alternative, convenient carrier material.

Other materials contemplated as equivalent in the process and practice of the invention are: dihexylene glycol peroxide; 4-(t-hexylperoxy)-4-methyl-2-pentanol; 4-(t-octylperoxy)-4-methyl-2-pentanol; 2-methyl-2-t-amylperoxy-4-pentanone; di-t-hexyl peroxide; di-t-octyl peroxide; the t-amyl, t-hexyl and t-octyl analogs of LUPEROX 101; mixed dialkyl peroxides such as t-amyl-t-hexyl peroxide and t-amyl-t-octyl peroxide; and mixtures thereof.

The following examples further illustrate the best mode contemplated by the inventors for the practice of their invention and should be construed as illustrative and not in limitation thereof.

EXAMPLES

In the following examples, Melt Flow Rate (MFR) was determined by the procedure of ASTM D-1238.

Half-life was determined by measuring the decomposition rate in the solvents or other medium shown.

Flash-point determinations were made using the small scale closed cup method (ASTM D3278).

Example 1

Comparison of Efficiency of Melt Flow Modification of Various Peroxides

A commercially available polypropylene random copolymer containing less than 5% by weight ethylene having an initial melt flow rate of 2 dg/min was treated in a 30 mm ZSK twin screw extruder having an essentially flat temperature profile (zone 1=210° C., zones 2 to 7=230° C.), at a feed rate of 200 grams per minute and at 300 RPM with equal active oxygen levels or A(O) (0.00081% A(O) or 5.08 meq/kg of polypropylene). The peroxide is added by first preparing a 2% by weight master batch of the neat liquid peroxide on polypropylene in particle form and then premixing with the polypropylene prior to addition to the extruder hopper.

The polypropylene is stabilized with 0.12 phr Irganox B225 [Ciba Chemicals Corporation, a blend of Irganox 1010, a hindered pnenolic antioxidant and Irgafos 168 (a phosphite heat stabilizer)] and 0.05 phr calcium stearate.

The resultant Melt Flow Rate (MFR) obtained from use of each peroxide in the above treatment is:

| PEROXIDE | MFR (dg/min) |
| --- | --- |
| LUPEROX 101 | 37.8 |
| 2,2-di(t-amylperoxy)propane | 24.3 |
| di-t-amyl peroxide | 36.3 |
| 4-(t-amylperoxy)-4-methyl-2-pentanol | 39.1 |

This establishes that on an equal active oxygen basis the peroxide of the present invention is approximately as effective as LUPEROX 101 (the industry standard for efficiency) and di-t-amylperoxide in the melt flow modification of polypropylene. It also establishes that 2,2-di-(t-amylperoxy) propane is not as efficient in melt flow modification.

Example 2

Flash-point Comparisons

The flash-point is determined as described above.

| PEROXIDE | FLASHPOINT (° C.) |
| --- | --- |
| LUPEROX 101 (92% assay) | 49 |
| LUPEROX 101 (95% assay) | 78 |
| di-t-amyl peroxide | 25 |

-continued

| PEROXIDE | FLASHPOINT (° C.) |
|---|---|
| 4-(t-amylperoxy)-4-methyl-2-pentanol | >60° C. (depending on preparation) |

This establishes that 4-(t-amylperoxy)-4-methyl-2-pentanol has a flashpoint in the range of LUPEROX 101 and is superior to that of di-t-amylperoxide.

Example 3
Half-life Temperature (HLT) Comparisons

The half-life of the peroxides listed is determined as described above:

| PEROXIDE | 1 hr HLT (°C.) In dodecane | 1 hr HLT (° C.) in polypropylene |
|---|---|---|
| LUPEROX 101 | 140 | 145 |
| 2,2-di(t-amylperoxy)propane | 128 | — |
| di-t-amyl peroxide | 143 | — |
| MEK cyclic trimer | — | 158 |
| 4-(t-amylperoxy)-4-methyl-2-pentanol | 141 | — |

This example demonstrates the close similarity of the half-life of 4-(t-amylperoxy)-4-methyl-2-pentanol to LUPEROX 101. This is contrasted to the significantly lower half-life of 2,2-di(t-amyperoxy)propane which makes it less efficient in polypropylene industrial processes.

Example 4
Comparison of Crosslinking Efficiency in Ethylene-co-vinylacetate Copolymer The maximum torque results are shown in the Example 4 Table. Example 4 Table:

| | di-t-amyl peroxide at | | | 4-(t-amylperoxy)-4-methyl-2-pentanol at | | |
|---|---|---|---|---|---|---|
| A[O] phr | 175° C. | 180° C. | 195° C. | 175° C. | 180° C. | 195° C. |
| 0.1 | 8.8 | 7.9 | 9.3 | 7.6 | 6.9 | 8.0 |
| 0.1 | 9.0 | 8.4 | 9.7 | | | |
| 0.2 | 12.6 | 11.8 | 13.3 | 9.9 | 9.8 | 10.6 |
| 0.3 | 13.0 | 12.3 | 14.2 | | | |

This demonstrates that 4-(t-amylperoxy)-4-methyl-2-pentanol is not an efficient crosslinking peroxide, contradicting the teachings of U.S. Pat. No. 3,236,872. Despite its poor crosslinking, the subject compound is efficient in polypropylene degradation or vis-breaking.

Example 5
Residual Decomposition Products in Polypropylene

In this example, samples of polypropylene modified by 4-(t-amylperoxy)-4-methyl-2-pentanol (designated "TAPMP" in the Example 5 Table) and LUPEROX 101 were compared for their content of residual decomposition products of the peroxides. Analysis was done on the following expected residuals: t-butanol, t-amyl alcohol, and hexylene glycol. Other very light residuals are expected (e.g. methane, ethane), but are quickly lost from the resin at the time of extrusion. The polypropylene was modified analogously to the procedure described in Example 1. The peroxide residuals in the polypropylene were determined by first extraction (in THF for t-butanol; in acetone for t-amyl alcohol and hexylene glycol) followed by GC analysis. The results were as follows:

Example 5 Table

| Peroxide | Conc. (ppm) | Conc. (% A[O]) | MFR (dg/min) | t-butyl alcohol (ppm) | t-amyl alcohol (ppm) | Hexylene Glycol (ppm) |
|---|---|---|---|---|---|---|
| Luperox 101[1] | 581 | 0.0061 | 28.0 ± 0.5[2] | 60 | n.d.[3] | n.d. |
| Luperox 101 | 775 | 0.0081 | 38.7 ± 1.1 | 70 | n.d. | n.d. |
| TAPMP | 775 | 0.0056 | 26.8 ± 1.0 | 30 | 4 | n.d. |
| TAPMP | 845 | 0.0061 | 28.8 ± 0.3 | 20 | n.d. | n.d. |
| TAPMP | 1126 | 0.0081 | 44.3 ± 0.9 | 40 | 5 | n.d. |
| Detection limit | | | | 3 | 3 | 25 |

[1]Luperox 101 used at 95% assay; TAPMP used at 92% assay
[2]Reported error in MFR values is the standard deviation from three measurements
[3]n.d. — not detected; i.e. value is below tne detection limit The crosslinking efficiency of di-t-amyl peroxide and 4-(t-amylperoxy)-4-methyl-2- pentanol was compared at equal active oxygen levels in ethylene-vinylacetate copolymers (EVA: EVATHANE 1020 VN-5-1, ATOFINA PETROCHEMICALS). Samples were prepared by absorbing the liquid peroxide into the EVA pellets at 40° C. for 1 to 3 hours in closed jars. Crosslinking efficiency was evaluated using an MDR 2000E cure rheometer at 1° of arc and three different cure temperatures: (175°, 180° and 195° C.). The maximum torque generated at the end of the cure ($M_H$) is recorded. $M_H$ increases with increased crosslink density and can, thus, be used as a convenient measure of peroxide efficiency in creating crosslinks.

From the data set given above it is evident that:

1. 4-(t-amylperoxy)-4-methyl-2-pentanol produces substantially less t-butanol than Luperox 101. Comparing at equal performance (i.e. equal melt flow rate), 4-(t-amylperoxy)-4-methyl-2-pentanol produces approximately ⅓ to ½ the amount of t-butanol.

2. The levels of t-butanol produced are significantly less than the FDA regulation maximum of 100 ppm [21 CFR 177.1520 (b)]

The subject matter which applicants regard as their invention is particularly pointed out and distinctly claimed as follows:

We claim:

1. A polypropylene containing composition comprising a polypropylene resin which has been molecular weight modified by a process comprising treating the resin with a molecular weight modifying-amount of 4-(t-amylperoxy)-4-methyl-2-pentanol for a time and at a temperature sufficient to induce decomposition of the 4-(t-amylperoxy)-4-methyl-2-pentanol and thereby modify the molecular weight of the resin, whereby the resin contains less than 100 parts per million by weight of t-butanol.

* * * * *